(12) United States Patent
Sullivan et al.

(10) Patent No.: US 11,451,795 B2
(45) Date of Patent: *Sep. 20, 2022

(54) SUPPLEMENTAL ENHANCEMENT INFORMATION INCLUDING CONFIDENCE LEVEL AND MIXED CONTENT INFORMATION

(71) Applicant: Microsoft Technology Licensing, LLC, Redmond, WA (US)

(72) Inventors: Gary J. Sullivan, Bellevue, WA (US); Yongjun Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,517

(22) Filed: Jul. 22, 2021

(65) Prior Publication Data

US 2021/0360264 A1 Nov. 18, 2021

Related U.S. Application Data

(63) Continuation of application No. 16/416,017, filed on May 17, 2019, now Pat. No. 11,115,668, which is a (Continued)

(51) Int. Cl.
*H04N 19/172* (2014.01)
*H04N 19/136* (2014.01)
(Continued)

(52) U.S. Cl.
CPC ......... *H04N 19/172* (2014.11); *H04N 19/136* (2014.11); *H04N 19/16* (2014.11); *H04N 19/46* (2014.11)

(58) Field of Classification Search
CPC .... H04N 19/172; H04N 19/136; H04N 19/16; H04N 19/46
See application file for complete search history.

(56) References Cited

U.S. PATENT DOCUMENTS 6,493,392 B1 12/2002 Chung et al.
11,115,668 B2 9/2021 Sullivan et al.
(Continued)

FOREIGN PATENT DOCUMENTS

CN 1170317 1/1998
CN 101005620 7/2007
(Continued)

OTHER PUBLICATIONS

Decision of Refusal dated Mar. 8, 2022, from Japanese Patent Application No. 2020/051841, 8 pp.
(Continued)

*Primary Examiner* — Richard T Torrente
(74) *Attorney, Agent, or Firm* — Klarquist Sparkman, LLP

(57) ABSTRACT

This application relates to video encoding and decoding, and specifically to tools and techniques for using and providing supplemental enhancement information in bitstreams. Among other things, the detailed description presents innovations for bitstreams having supplemental enhancement information (SEI). In particular embodiments, the SEI message includes picture source data (e.g., data indicating whether the associated picture is a progressive scan picture or an interlaced scan picture and/or data indicating whether the associated picture is a duplicate picture). The SEI message can also express a confidence level of the encoder's relative confidence in the accuracy of this picture source data. A decoder can use the confidence level indication to determine whether the decoder should separately identify the picture as progressive or interlaced and/or a duplicate picture or honor the picture source scanning information in the SEI as it is.

20 Claims, 5 Drawing Sheets

Related U.S. Application Data continuation of application No. 13/859,626, filed on Apr. 9, 2013, now abandoned.

(60) Provisional application No. 61/777,913, filed on Mar. 12, 2013, provisional application No. 61/708,041, filed on Sep. 30, 2012.

(51) Int. Cl.
   *H04N 19/16* (2014.01)
   *H04N 19/46* (2014.01)

(56) References Cited

U.S. PATENT DOCUMENTS

| | | | |
|---|---|---|---|
| 2005/0013497 A1 | 1/2005 | Hsu et al. | |
| 2006/0072668 A1* | 4/2006 | Srinivasan | H04N 19/136 375/E7.181 |
| 2007/0002170 A1 | 1/2007 | Li | |
| 2008/0019438 A1* | 1/2008 | Takahashi | H04N 19/46 375/E7.199 |
| 2014/0079116 A1* | 3/2014 | Wang | H04N 13/178 375/240.02 |

FOREIGN PATENT DOCUMENTS

| | | |
|---|---|---|
| CN | 102223541 | 10/2011 |
| CN | 102651788 | 8/2012 |

OTHER PUBLICATIONS

Bross et al., "High Efficiency Video Coding (HEVC) text specification draft 10 (for FDIS & Consent)," JCTVC-L1003_v8, 8 pp. (Jan. 2013).

Communication pursuant to Article 94(3) EPC dated Feb. 7, 2022, from European Patent Application No. 13774861.2, 4 pp.

Notice of Reasons for Refusal dated Oct. 5, 2021, from Japanese Patent Application No. 2020-051841, 6 pp.

Office Action dated Nov. 23, 2021, from Chinese Patent Application No. 201811172379.9, 19 pp.

Bross et al., "High efficiency video coding (HEVC) text specification draft 7," JCTVC-I1003_d0, 268 pp. (May 2012).

Kim et al., "Coefficient Scan for Transform Skip Mode," JCTVC-J0202_r1, 7 pp. (Jul. 2012).

Notification to Grant Patent Right dated May 7, 2022, from Chinese Patent Application No. 201811172379.9, 6 pp.

Liang, "Research on Advanced Video Coding Tools of AVS," M.Eng. Thesis, Huazhong University of Science and Technology, 67 pp. (Mar. 2006). [with English abstract].

* cited by examiner software 180 implementing one or more innovations for encoding or decoding pictures with confidence level fields and/or picture characteristic flags

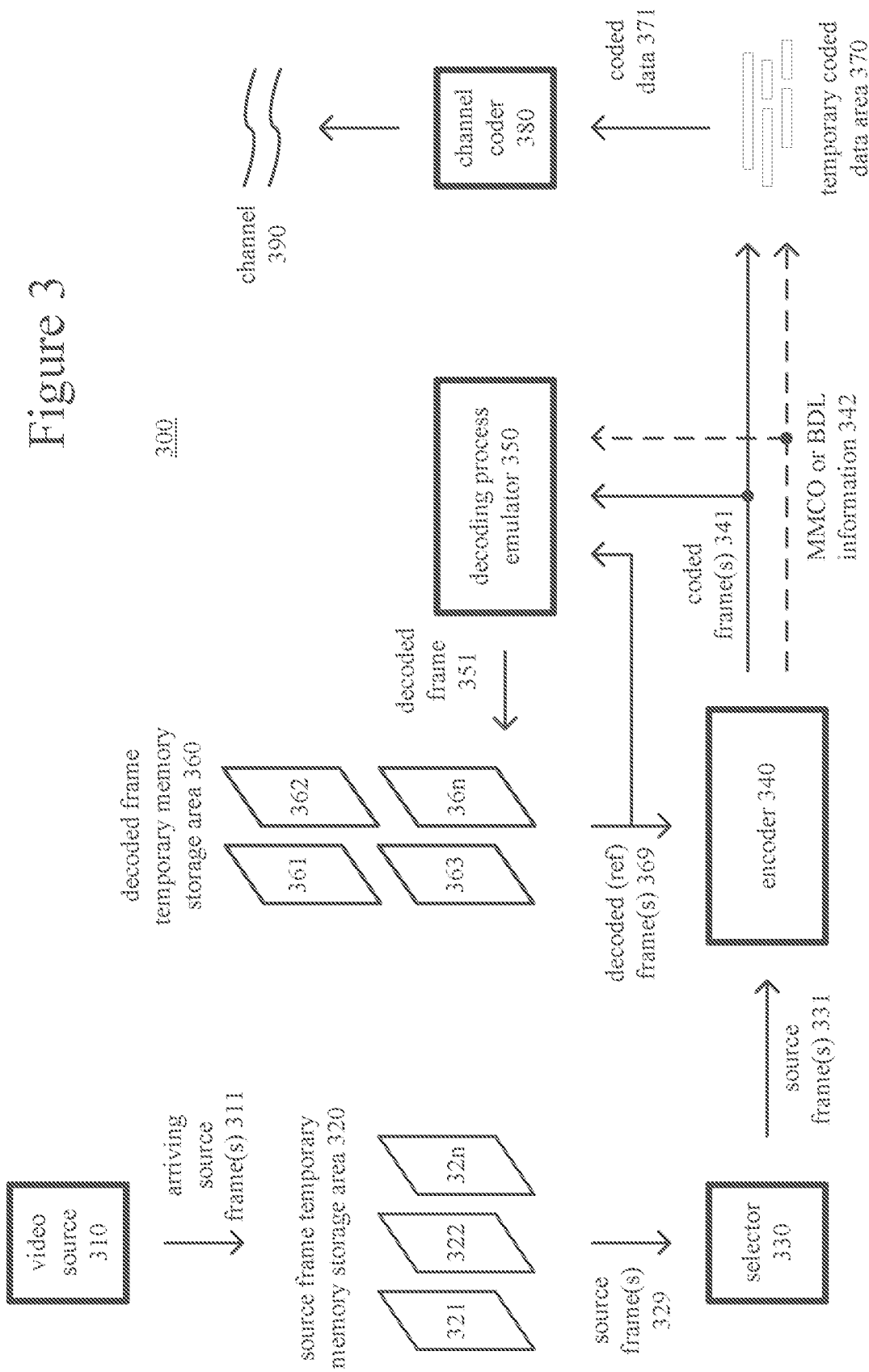

SUPPLEMENTAL ENHANCEMENT INFORMATION INCLUDING CONFIDENCE LEVEL AND MIXED CONTENT INFORMATION

CROSS REFERENCE TO RELATED APPLICATIONS

This application is a continuation of U.S. patent application Ser. No. 16/416,017, filed May 17, 2019, and entitled "SUPPLEMENTAL ENHANCEMENT INFORMATION INCLUDING CONFIDENCE LEVEL AND MIXED CONTENT INFORMATION," which is a continuation of U.S. patent application Ser. No. 13/859,626 filed on Apr. 9, 2013, and entitled "SUPPLEMENTAL ENHANCEMENT INFORMATION INCLUDING CONFIDENCE LEVEL AND MIXED CONTENT INFORMATION," which claims the benefit of U.S. Provisional Application No. 61/708,041 filed on Sep. 30, 2012, and entitled "FIELD INDICATION MESSAGES INCLUDING CONFIDENCE LEVEL AND MIXED CONTENT INFORMATION," and which claims the benefit of U.S. Provisional Application No. 61/777,913, filed on Mar. 12, 2013, and entitled "SUPPLEMENTAL ENHANCEMENT INFORMATION INCLUDING CONFIDENCE LEVEL AND MIXED CONTENT INFORMATION", all of which are hereby incorporated herein by reference.

FIELD

This application relates to video encoding and decoding, and specifically to tools and techniques for using and providing supplemental enhancement information in bitstreams.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2, H.263, and H.264 (AVC or ISO/IEC 14496-10) standards and the MPEG-1 (ISO/IEC 11172-2). MPEG-4 Visual (ISO/IEC 14496-2), and SMPTE 421M (VC-1) standards. More recently, the HEVC (H.265) standard is under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

SUMMARY

Among other things, the detailed description presents innovations for bitstreams having supplemental enhancement information (SEI). In particular embodiments, the SEI message includes picture source data (e.g., data indicating whether the associated uncompressed picture is a progressive scan picture or an interlaced scan picture and/or data indicating whether the associated picture is a duplicate picture) and can also express a confidence level of the encoder's relative confidence in the accuracy of this picture source data format. A decoder can use the confidence level indication to determine whether the decoder should separately identify the picture as progressive or interlaced and/or a duplicate picture on display.

In certain implementations, the SEI message also includes an indicator for indicating whether the associated picture includes mixed data (e.g., a mixture of interlaced and progressive data). Such innovations can help improve the ability for video decoding systems to flexibly determine how to process the encoded bitstream or bitstream portion.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

DETAILED DESCRIPTION

The detailed description presents innovations for encoding and decoding bitstreams having supplemental enhancement information SEI). In particular, the detailed description describes embodiments in which an SEI message for a picture includes a confidence level indicator indicating the confidence in the accuracy of the syntax elements or flags in the SEI message that indicate whether the picture is a progressive scan or interlaced scan picture. In some embodiments, one or more syntax elements can together express whether the associated one or more pictures are progressive scan, interlaced scan, or of an unknown source. In certain embodiments, the SEI message further includes a flag for indicating whether the associated picture includes a mixture of data and/or whether the associated picture is a duplicate picture.

Some of the innovations described herein are illustrated with reference to syntax elements and operations specific to the HEVC standard. For example, reference is made to certain draft versions of the HEVC specification-namely, draft version JCTVC-11003 of the HEVC standard—"High efficiency video coding (HEVC) text specification draft 8", JCTVC-I1003_d8, 10$^{th}$ meeting, Stockholm, July 2012, and draft version JCTVC-L1003 of the HEVC standard—"High efficiency video coding (HEVC) text specification draft 10". JCTVC-L1003_v34, 12$^{th}$ meeting. Geneva, C H Jan. 14-23, 2013. The innovations described herein can also be implemented for other standards or formats.

More generally, various alternatives to the examples described herein are possible. For example, any of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
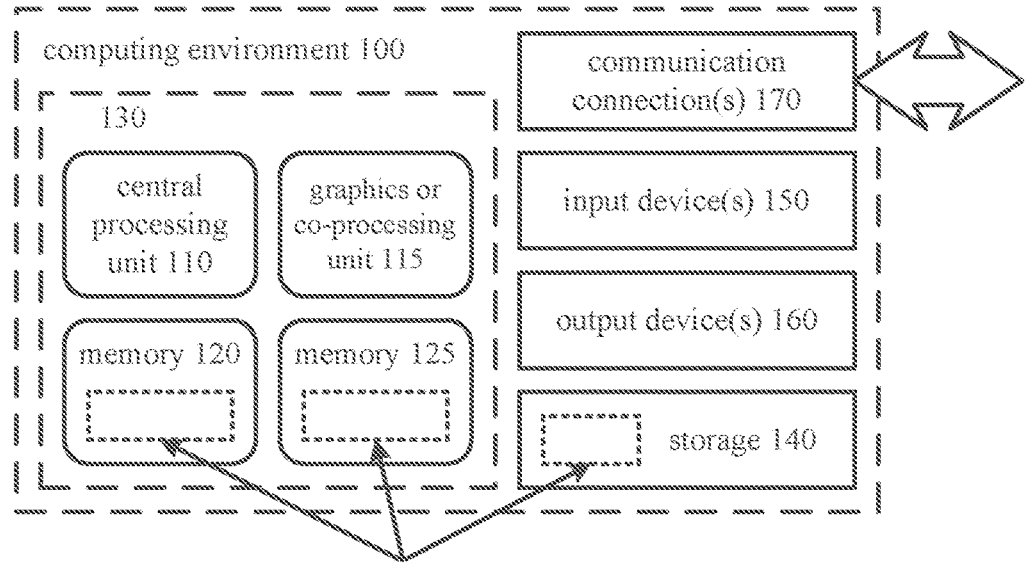
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM. EEPROM, flash memory, etc.), or some combination of the two, accessible by the processing unit(s). The memory (120, 125) stores software (180) implementing one or more innovations for encoding or decoding pictures with SEI messages having data indicating a picture source type, a confidence level, and whether an associated picture includes a mixture of data types (see Section V), in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs. DVDs, or any other medium which can be used to store information in a non-transitory way and which can be accessed within the computing system (100). The storage (140) stores instructions for the software (180) implementing one or more innovations for encoding or decoding pictures with SEI messages having data indicating a picture source type, a confidence level, and whether an associated picture includes a mixture of data types (see Section V).

The input device(s) (150) may be a touch input device such as a keyboard, mouse, pen, or trackball, a voice input device, a scanning device, or another device that provides input to the computing system (100). For video encoding, the input device(s) (150) may be a camera, video card. TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, tangible computer-readable media include memory (120, 125), storage (140), and combinations thereof, but do not include transitory propagating signals.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an application specific integrated circuit ("ASIC") (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
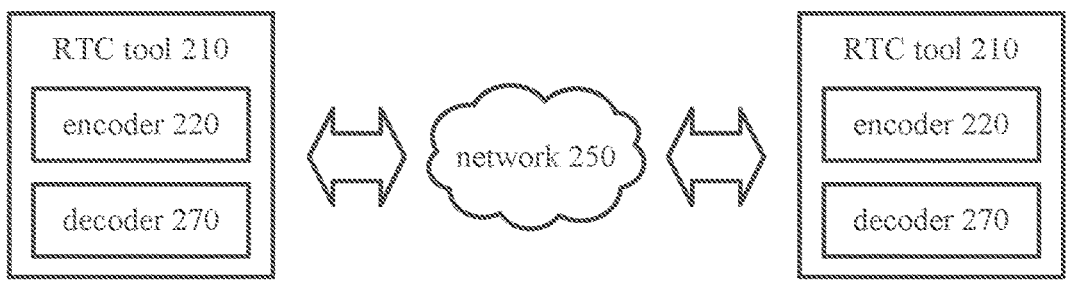
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO-IEC 14496-10 standard (also known as H.264 or AVC). HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 4:
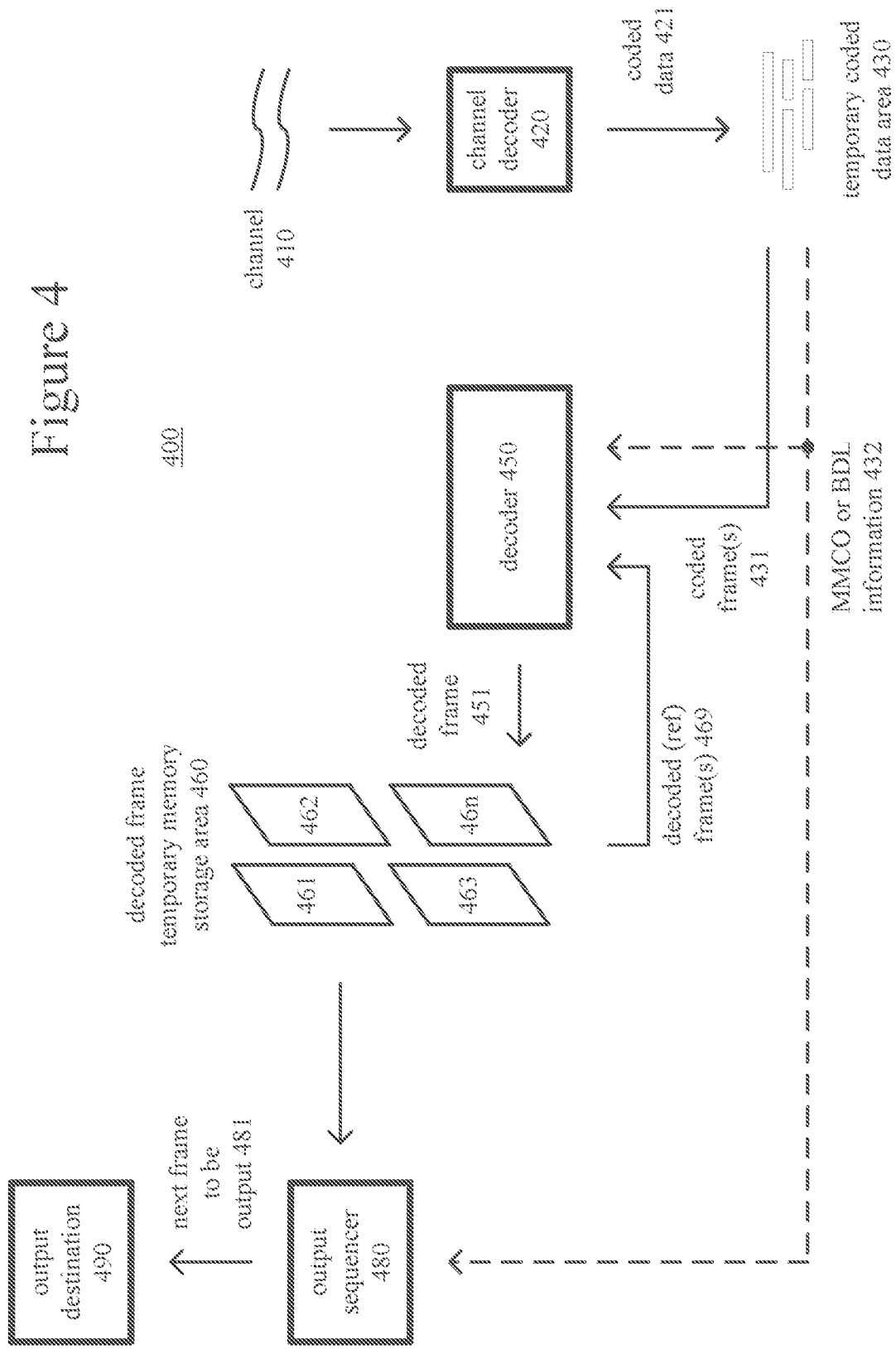
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library and/or as a standalone application. Overall, the encoder system (300) receives a sequence of source video frames (311) from a video source (310) and produces encoded data as output to a channel (390). The encoded data output to the channel can include supplemental enhancement information ("SEI") messages that include the syntax elements and/or flags described in Section V.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, for interlaced video, two complementary interlaced video fields are encoded as an interlaced video frame or separate fields. Aside from indicating a progressive video frame, the term "frame" can also indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310). e.g., a frame may be ahead in order, to facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control operation (MMCO) signals (342) or reference picture set (RPS) information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1. MPEG-2, or MPEG-4. H.26x format (e.g., H.261, H.262. H.263, H.264). HEVC format or other format.

For example, within the encoder (340), an inter-coded, predicted frame is represented in terms of prediction from reference frames. A motion estimator estimates motion of macroblocks, blocks or other sets of samples of a source frame (341) with respect to one or more reference frames (369). When multiple reference frames are used, the multiple reference frames can be from different temporal directions or the same temporal direction. The motion estimator outputs motion information such as motion vector information, which is entropy coded. A motion compensator applies motion vectors to reference frames to determine motion-compensated prediction values. The encoder determines the differences (if any) between a block's motion-compensated prediction values and corresponding original values. These prediction residual values are further encoded using a frequency transform, quantization and entropy encoding. Similarly, for intra prediction, the encoder (340) can determine intra-prediction values for a block, determine prediction residual values, and encode the prediction residual values. In particular, the entropy coder of the encoder (340) compresses quantized transform coefficient values as well as certain side information (e.g., motion vector information, quantization parameter values, mode decisions, parameter choices). Typical entropy coding techniques include Exp-Golomb coding, arithmetic coding, differential coding. Huffman coding, run length coding, variable-length-to-variable-length (V2V) coding, variable-length-to-fixed-length (V2F) coding, LZ coding, dictionary coding, probability interval partitioning entropy coding (PIPE), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are also buffered in a temporary coded data area (370). The coded data that is aggregated in the coded data area (370) can also include media metadata relating to the coded video data (e.g., as one or more parameters in one or more supplemental enhancement information ("SEI") messages or video usability information ("VUI") messages). The SEI messages can include the syntax elements and/or flags described in Section V.

The aggregated data (371) from the temporary coded data area (370) are processed by a channel encoder (380). The channel encoder (380) can packetize the aggregated data for transmission as a media stream (e.g., according to a media container format such as ISO/IEC 14496-12), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include supplemental enhancement information ("SEI") messages that include the syntax elements and/or flags described in Section V.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media container format such as ISO/IEC 14496-12), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) can also include media metadata relating to the encoded video data (e.g., as one or more parameters in one or more SEI messages or VUI messages). The SEI messages can include the syntax elements and/or flags described in Section V. In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms and motion compensation. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and makes the received encoded data available to an entropy decoder. The entropy decoder entropy decodes entropy-coded quantized data as well as entropy-coded side information, typically applying the inverse of entropy encoding performed in the encoder. Section V describes examples of coded data having SEI messages that include the syntax elements and/or flags described in Section V, which can be decoded by the decoder 450. A motion compensator applies motion information to one or more reference frames to form motion-compensated predictions of sub-blocks, blocks and/or macroblocks (generally, blocks) of the frame being reconstructed. An intra prediction module can spatially predict sample values of a current block from neighboring, previously reconstructed sample values. The decoder (450) also reconstructs prediction residuals. An inverse quantizer inverse quantizes entropy-decoded data. An inverse frequency transformer converts the quantized, frequency domain data into spatial domain information. For a predicted frame, the decoder (450) combines reconstructed prediction residuals with motion-compensated predictions to form a reconstructed frame. The decoder (450) can similarly combine prediction residuals with spatial predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . , 46n). The decoded frame storage area (460) is an example of a DPB. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Exemplary Embodiments for Indicating Confidence Levels of Type Indication Information and Mixed Characteristics of Video Frames This section describes several variations for encoding and/or decoding bitstreams having information (e.g., syntax elements, flags, or extensions thereof) for indicating an encoder confidence level of picture source data. In particular, this section presents examples in which an SEI message includes an indication of a degree of confidence of picture source data in the message (e.g., a confidence level in the accuracy of the progressive_source_flag, mixed_characteristics_flag, and/or duplicate_flag in the SEI message (or in any equivalent flag or syntax element)). Such additional information is useful because some encoders may not be able to determine with certainty accurate values for the picture source data. Adding an indicator to express a degree of confidence in the picture source data can assist decoders in determining how best to use and present the received picture data. Furthermore, encoders can also encounter video content that has mixed progressive/interlace characteristics. In certain implementations, an additional syntax element or flag can be included to indicate that the content has mixed characteristics rather than exhibiting purely-interlaced or purely-progressive source characteristics. Any of the encoders or decoders described above can be adapted to use the disclosed encoding and decoding techniques.

According to draft 8 of the HEVC standard ("High efficiency video coding (HEVC) text specification draft 8", JCTVC-I1003_d8, 10$^{th}$ meeting. Stockholm, July 2012), there are two syntax elements in the "field indication" SEI message that are used to describe the properties of the picture source: The progressive_source_flag and the duplicate_flag. A progressive_source_flag value of "1" indicates that the scan type of the associated picture should be interpreted as progressive, and a progressive_source_flag value of "0" indicates that the scan type of the associated picture should be interpreted as interlaced. When the field indication SEI message is not present, the value of the progressive_source_flag is inferred to be equal to "1". In other implementations, these values are inverted.

Furthermore, a duplicate_flag value of "1" indicates that the current picture is a duplicate of a previous picture in output order, and a duplicate_flag value of "0" indicates that the current picture is not a duplicate picture. In other implementations, these values are inverted.

In some application scenarios, however, an HEVC encoding system might not have enough information to determine a correct value for the progressive_source_flag and/or the duplicate_flag syntax elements. For instance, the encoding system might simply receive fields or frames as input video data and may have limitations in its computation power, memory capacity, or delay characteristics that do not enable the encoder to perform a deep analysis of the source content characteristics. Further, some encoding systems might only have limited access to the information from the uncompressed pictures. Thus, it can be difficult for the encoding system to determine the true characteristics of the source. It is also possible that the source content can exhibit mixed characteristics. For example, the source content may be a mixture of interlaced and progressive content. A field-based text or graphics overlay applied to a progressive-scan video is one example of content having mixed characteristics.

To address these concerns, embodiments of the disclosed technology comprise an encoder that is able to indicate the degree of confidence it has in its indication of whether the content is interlaced or progressive. A decoder or display subsystem can use the indicated degree of confidence to control subsequent processing, such as de-interlace processing or whether the decoder should detect the source video properties for itself rather than relying on those indicated by the encoder. Further, in some implementations, the encoder is able to indicate whether the encoded content has mixed characteristics. This indication of mixed progressive-interlaced content can also be used by the decoder to appropriately process an encoded bitstream.

In certain embodiments, the an SEI message (e.g., an SEI message that accompanies a picture) includes a flag or syntax element for indicating a confidence level of the source indication (e.g., a value indicating the accuracy of the encoder's source indication of whether the content is interlaced or progressive data and/or the encoder's duplicate picture indication).

In the context of draft 8 of the HEVC standard, for example, the field indication SEI message can include a syntax element for indicating the confidence level of the syntax elements of the field indication information that indicate source video properties—specifically, the confidence level of the progressive_source_flag and/or the duplicate_flag. Furthermore, in certain implementations, the field indication SEI message also includes a flag for indicating whether or not the encoded content includes mixed characteristics (e.g., mixed progressive and interlaced content).

In one particular implementation, the syntax for the field_indication SEI message is as follows:

TABLE 1

Example field indication SEI message syntax

| | Descriptor |
| --- | --- |
| field_indication( payloadSize ) { | |
|   field_pic_flag | u(1) |
|   progressive_source_flag | u(1) |
|   mixed_characteristics_flag | u(1) |
|   duplicate_flag | u(1) |
|   if( field_pic_flag ) | |
|     bottom_field_flag | u(1) |
|   else if( !progressive_source_flag ) | |
|     top_field_first_flag | u(1) |
|   Else | |
|     reserved_zero_1bit /* equal to 0 */ | u(1) |
|   confidence_level | u(2) |
|   reserved_zero_bit /* equal to 0 */ | u(1) |
| } | |

Of note in the exemplary syntax shown above are the "mixed_characteristics_flag" and the "confidence_level" syntax element.

In one example implementation, a mixed_characteristics_flag equal to "1" indicates that the video content has mixed progressive and interlaced scan characteristics. Such mixed-characteristic video can be generated, for example, when field-based graphics overlay otherwise-progressive-scan video content. A mixed_characteristics_flag equal to "0" indicates that the video content does not have mixed characteristics. In other implementations, the values of the mixed_characteristics_flag are inverted from those described above.

The confidence_level syntax element can be a one-bit syntax element, a two-bit syntax element, or a syntax element of more than two bits. In certain embodiments, the confidence_level syntax element is a two-bit syntax element. In one particular implementation, for example, a confidence_level syntax element equal to "3" indicates a high degree of assurance that any one or more of the progressive_source_flag, source_scan_type, mixed_characteristics_flag, or duplicate_flag are correct and that the decoder may confidently rely on this information; a confidence_level syntax element equal to "2" indicates a reasonable degree of confidence that any one or more of these syntax elements are correct and that it is recommended for subsequent processes (e.g., subsequent decoder processes) to honor the information unless substantial capabilities are available in the decoder to conduct further analysis of the content characteristics; a confidence_level syntax element equal to "1" indicates that further analysis of the content characteristics should be conducted if feasible; and a confidence_level syntax element equal to "0" indicates that subsequent processes should not rely on the correctness of these syntax elements.

It should be understood that these four exemplary levels are examples only and that any other number of levels can be used. For instance, in certain embodiments, a 2-bit confidence level syntax element can be used to flag three levels of confidence: a level of high certainty in which the decoder shall (or should) use the source indication information, a level of medium certainty in which the decoder should honor the information unless the decoder can detect the source information accurately during decoding, and a level of low or no certainty in which decoder should perform its own detection of the source indication information.

Furthermore, in certain embodiments, multiple confidence_level syntax elements are used. For example, separate confidence_level syntax elements may exist for the progressive_source_flag, mixed_characteristics_flag, or duplicate_flag.

As described above, embodiments of the disclosed technology comprise adding information to a supplemental enhance information (SEI) message that indicates a confidence level of the accuracy of data contained in the message. For instance, in particular implementations, the disclosed technology comprises an extension to a picture-level SEI message in the HEVC standard. Further, some embodiments additionally or alternatively include a flag for describing source characteristics of the video content (e.g., a flag for indicating that the video comprises mixed characteristics). The confidence level syntax element and the source characteristic syntax element can be useful, for example, in scenarios in which the encoder has limited information about the scan format of the origin of the video content, limited analysis resources, and/or limited access to the uncompressed pictures.

In some instances, the decoder system has limited computational power, limited access to the uncompressed pictures, or has some other limitation that makes it difficult or impossible for the decoder to analyze the decoded video or to process it in a manner customized to respond to the indicated confidence level information. In such circumstances, the decoder may be unable to derive the content characteristics for itself. Accordingly, in certain embodiments, the decoder system honors the field indication or picture timing information in the encoded bitstream "as is". That is, in certain implementations, the decoder does not use the confidence_level syntax element, but follows the information in the SEI message regardless of the confidence level.

It should be understood that the mixed_characteristics_flag and the confidence_level indication syntax element can be implemented separately from one another in certain embodiments of the disclosed technology. If the confidence_level indication syntax element is used without the mixed_characteristics_flag, the semantics of the confidence_level indication will typically not have any mention of the mixed_characteristics_flag in its semantics.

More recently, according to draft 10 of the HEVC standard ("High efficiency video coding (HEVC) text specification draft 10", JCTVC-L1003_v34, 12$^{th}$ meeting. Geneva. CH, January 2013), the source type information is conveyed using different flags. In particular, according to draft 10, picture source information is included in a "picture timing" SEI message. In particular, the picture timing SEI message is a picture level SEI message that includes a source_scan_type syntax element and a duplicate_flag syntax element. Further, in draft 10, a source_scan_type value equal to "1" indicates that the source_scan type of the associated picture should be interpreted as progressive, and a source_scan_type value equal to "0" indicates that the source_scan type of the associated picture should be interpreted as interlaced. Furthermore, a source_scan_type value equal to "2" indicates that the source scan type of the associated picture is unknown or unspecified, while a source_scan_type equal to "3" is reserved for future use and shall be interpreted by decoders as being equivalent to the value "2".

In particular implementations, the value of source_scan_type is determined from two syntax elements present in profile, tier, and/or level information (e.g., in a profile, tier, or level SEI message): general_progressive_source_flag and general_interlaced_source_flag. Furthermore, source_scan type syntax element may not always be present, in which case the general_progressive_source_flag and general_interlaced_source_flag can be used to determine the source type.

In one example implementation, general_progressive_source_flag and general_interlaced_source_flag are interpreted as follows. If general_progressive_source_flag is equal to "1" and general_interlaced_source_flag is also equal to "0", the source_scan type of the pictures in the associated coded video segment should be interpreted as progressive. In this case, and in one particular implementation, the value of source_scan_type is equal to "1" when present, and should be inferred to be equal to "1" when not present. If general_progressive_source_flag is equal to "0" and general_interlaced_source_flag is equal to "1", the source scan type of the pictures in the associated coded video segment should be interpreted as interlaced. In this case, and in one particular implementation, the value of source_scan_type is equal to "0" when present, and should be inferred to be equal to "0" when not present. If general_progressive_source_flag is equal to "0" and general_interlaced_source_flag is equal to "0", the source scan type of the pictures in the associated coded video segment should be interpreted as unknown or unspecified. In this case, and in one particular implementation, the value of source_scan_type is "2" when present, and should be inferred to be "2" when not present. If general_progressive_source_flag is equal to "1" and general_interlaced_source_flag is equal to "1", then the source scan type of each picture in the associated coded video segment is independently indicated at the picture level using a syntax element (e.g., the source_scan_type in a picture timing SEI message). It should be understood that these values are for example purposes only and that different values or combinations of values can be used to signal a progressive picture, an interlaced picture, or a picture having an unknown scan source.

The general_progressive_source_flag and general_interlaced_source_flag operate similar to the progressive_source_flag and the confidence_level syntax element described above. In particular, like the collective operation of the progressive_source_flag and the confidence_level syntax element, the general_progressive_source_flag and general_interlaced_source_flag together operate to identify whether one or more pictures are progressive or interlaced and a confidence level associated with that determination. For example, when general_progressive_source_flag and general_interlaced_source_flag are "1" and "0" (or "0" and "1"), then the syntax elements indicate that the picture is progressive (or interlaced). Furthermore, this indication has a high level of confidence. If, however, there is a low level of confidence in the picture type, then the general_progressive_source_flag and general_interlaced_source_flag each have values of "0", indicating that the source scan type is unknown. Thus, the general_progressive_source_flag and general_interlaced_source_flag present information having the same quality or character as the confidence_level syntax element and progressive_source_flag introduced above, just using a slightly different format.

Draft 10 of the HEVC standard also includes a duplicate_flag syntax element. In the particular implementation described, a duplicate_flag value of "1" indicates that the current picture is indicated to be a duplicate of a previous picture in output order, whereas a duplicate_flag value of "0" indicates that the current picture is not indicated to be a duplicate of a previous picture in output order.

In the context of draft 10 of the HEVC standard, the picture timing SEI message can include a source_scan_type syntax element for indicating the whether the picture is progressive, interlaced, or unknown (as described above). The picture timing SEI message can also include a duplicate_flag.

In one particular implementation, the syntax for the picture timing SEI message (also referred to as the pic_timing SEI message) is as follows:

TABLE 2

| | Descriptor |
|---|---|
| pic_timing( payloadSize ) { | |
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_minus1 | u(v) |
|     pic_dpb_output_delay | u(v) |
|     if( sub_pic_cpb_params_present | |
|       pic_dpb_output_du_delay | u(v) |
|     if( sub_pic_cpb_params_present_flag && | |
|       sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag ) | |
|         du_common_cpb_removal_delay_increment_minus1 | u(v) |
|       for( i = 0; i <= num_decoding_units_minus1;i++ ) { | |
|         num_nalus_in_du_minus1[ i ] | ue(v) |
|         if( Idu_common_cpb_removal_delay_flag && i < num_decoding_units_minus1 ) | |
|           du_cpb_removal_delay_increment_minus1[ i ] | u(v) |
|       } | |
|     } | |
|   } | |
| } | |

Furthermore, although not currently in the draft HEVC standard, in certain implementations, the picture timing SEI message can also include a flag for indicating whether or not the encoded content includes mixed characteristics (e.g., mixed progressive and interlaced content). For example, and in one example implementation, a mixed_characteristics_flag can be used to indicate whether a picture has mixed progressive and interlaced scan characteristics. For instance, a mixed_characteristics_flag equal to "1" indicates that the video content has mixed progressive and interlaced scan characteristics. Such mixed-characteristic video can be generated, for example, when field-based graphics overlay otherwise-progressive-scan video content. A mixed_characteristics_flag equal to "0" indicates that the video content does not have mixed characteristics. In other implementations, the values of the mixed_characteristics_flag are inverted from those described above.

Additionally, a separate confidence level syntax element can be created and used together with the general_progressive_source_flag, the general_interlaced_source_flag, and/or the source_scan_type syntax element. For instance, a confidence level syntax element can be used to indicate the confidence of the information indicated by the general_progressive_source_flag and the general_interlaced_source_flag. The confidence level syntax element can have any number of levels. For example, the syntax element can be a single-bit syntax element, a two-bit syntax element, or greater. Furthermore, in certain embodiments, multiple confidence_level syntax elements are used. For example, separate confidence_level syntax elements may exist for the source_scan_type element, mixed_characteristics_flag, or duplicate_flag.

Figure 5:
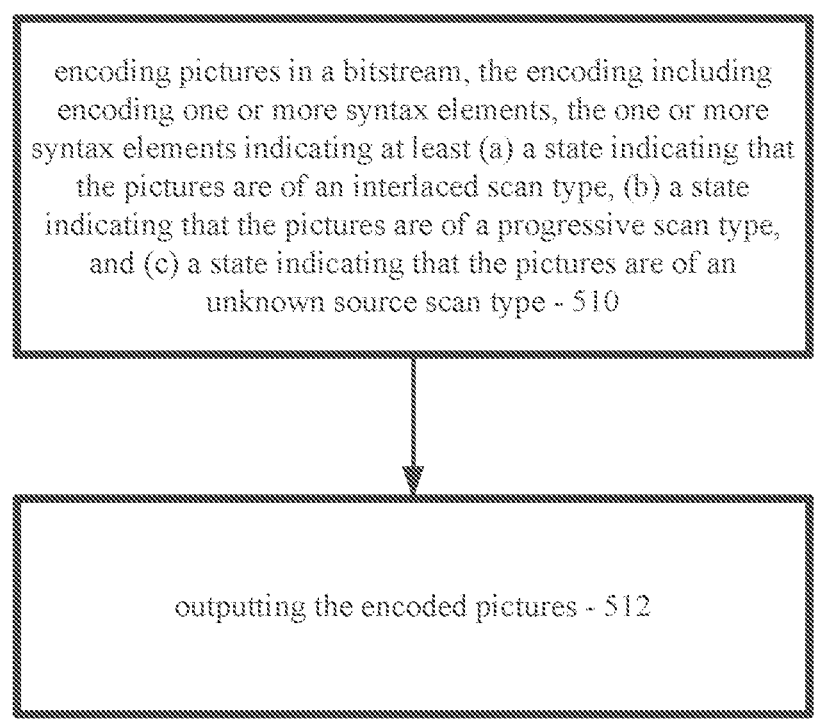
FIG. 5 is a flow chart of a first exemplary method for using supplemental enhancement information in accordance with an embodiment of the disclosed technology.

FIG. 5 is a flow chart 500 for a generalized encoding method according to embodiments of the disclosed technology. The illustrated method can be performed using computing hardware (e.g., a computer processor or an integrated circuit). For instance, the methods can be performed by computing hardware such as shown in FIG. 1. Furthermore, the method can also be implemented as computer-executable instructions stored on one or more computer-readable storage media (e.g., tangible computer-readable storage media).

At 510, one or more pictures of a bitstream or bitstream portion are encoded. In the illustrated embodiment, the one or more pictures are encoded along with one or more syntax elements that are used to indicate a source scan type for the one or more pictures. The one or more syntax elements can be included, for example, in an SEI message. Further, the syntax elements can be picture specific or can identify characteristics of two or more pictures. In the illustrated embodiment, the syntax elements indicate one or more of the following states for the encoded pictures: (a) a state indicating that the one or more pictures are of an interlaced scan type, (b) a state indicating that the one or more pictures are of a progressive scan type, and (c) a state indicating that the one or more pictures are of an unknown source scan type.

At 512, the encoded bitstream or bitstream portion is output (e.g., stored on non-volatile computer-readable medium and/or transmitted).

In particular implementations, the one or more syntax elements comprise a first flag indicating whether the one or more pictures are of an interlaced scan type and a second flag indicating whether the one or more pictures are of a progressive scan type. In other implementations, the one or more syntax elements comprise a single syntax element. Still further, in some implementations, the one or more syntax elements comprise a first syntax element of one or more bits (a source indicator) indicating whether the one or more pictures are of a progressive scan type or not, and a second syntax element of one or more bits (a confidence level) indicating a confidence level of the value of the first flag. In such implementations, the confidence level syntax element can indicate two or more confidence levels. For example, the confidence level syntax element can include four confidence levels, a first of the confidence levels signaling that the source indicator is accurate, a second of the confidence levels signaling that the source indicator is likely accurate, a third of the confidence level indicating that the source indicator is likely not accurate, and a fourth of the confidence levels indicating that the source indicator is not accurate.

In some implementations, the act of encoding can further include encoding a duplicate picture flag indicating whether the one or more pictures are duplicate pictures and/or a mixed data flag indicating whether the one or more pictures include a mixture of video types.

Figure 6:
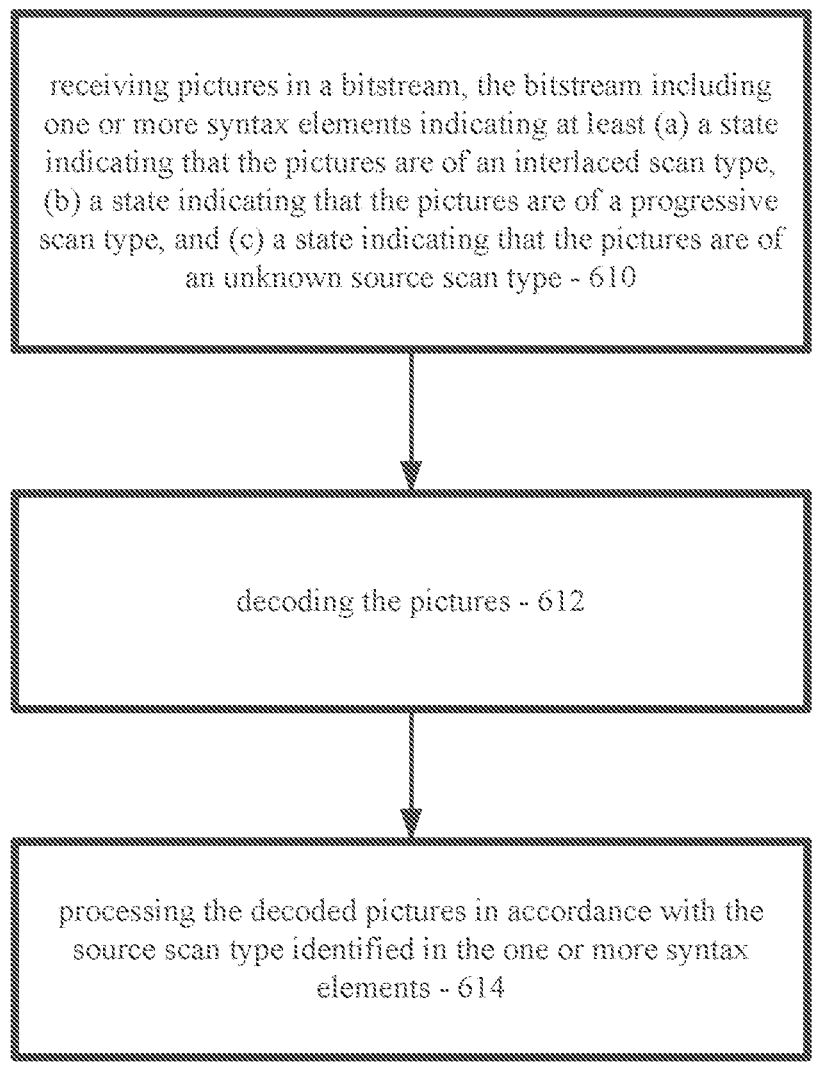
FIG. 6 is a flow chart of a first exemplary method for using supplemental enhancement information in accordance with an embodiment of the disclosed technology.

FIG. 6 is a flow chart 600 for a generalized decoding method according to embodiments of the disclosed technology. The illustrated method can be performed using computing hardware (e.g., a computer processor or an integrated circuit). For instance, the methods can be performed by computing hardware such as shown in FIG. 1, or as computer-executable instructions stored on one or more computer-readable storage media (e.g., tangible computer-readable storage media).

At 610, one or more pictures of a bitstream or bitstream portion are received (e.g., loaded, buffered, or otherwise prepared for further processing). In the illustrated embodiment, the bitstream or bitstream portion further includes one or more syntax elements used to indicate a picture source scan type for the one or more pictures. The syntax elements can be picture specific or can identify characteristics of two or more pictures. In the illustrated embodiment, the syntax elements indicate one or more of the following states for the one or more decoded pictures: (a) a state indicating that the one or more pictures are of an interlaced scan type. (b) a state indicating that the one or more pictures are of a progressive scan type, and (c) a state indicating that the one or more pictures are of an unknown source scan type.

At 612, the one or more pictures are decoded (e.g., using any of the decoding disclosed above, described in the draft HEVC standards discussed herein, or any other known decoding technique).

At 614, the decoded one or more pictures are processed in accordance with the source scan type identified by the one or more syntax elements. For example, in some embodiments, the one or more pictures can be displayed according to the identified scan type (e.g., interlaced or progressive scan video can be displayed). In other embodiments, the decoded one or more pictures can be processed for later displaying. For instance, a decoder device implementing the illustrated method can de-interlace pictures that are signaled as interlaced and then transcode, store, and/or transmit the resulting video (e.g., transmit the video to another device or module that stores the video or causes it to be displayed). In situations where the one or more syntax elements indicate low-level of confidence or that the scan type is unknown, the processing can involve analyzing the one or more pictures in order to determine their scan type.

In particular implementations, the one or more syntax elements comprise a first flag indicating whether the one or more pictures are of an interlaced scan type and a second flag indicating whether the one or more pictures are of a progressive scan type. In other implementations, the one or more syntax elements comprise a single syntax element. Still further, in some implementations, the one or more syntax elements comprise a first syntax element of one or more bits (a source indicator) indicating whether the one or more pictures are progressive scan or not, and a second syntax element of one or more bits (a confidence level) indicating a confidence level of the value of the first flag. In such implementations, the confidence level syntax element can indicate two or more confidence levels. For example, the confidence level syntax element can include four confidence levels, a first of the confidence levels signaling that the source indicator is accurate, a second of the confidence levels signaling that the source indicator is likely accurate, a third of the confidence level indicating that the source indicator is likely not accurate, and a fourth of the confidence levels indicating that the source indicator is not accurate.

In some implementations, the act of decoding can further include decoding a duplicate picture flag indicating whether the one or more pictures are duplicate pictures and/or a mixed data flag indicating whether the one or more pictures include a mixture of video types.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

We claim:

1. A method performed by an encoder device, the method comprising:
    determining a first flag and a second flag for identifying source scan type of pictures in a sequence, the first flag and the second flag collectively and exclusively indicating one of the following unique states for the sequence of pictures: a state indicating that the source scan type of the pictures in the sequence is interlaced, a state indicating that the source scan type of the pictures in the sequence is progressive, a state indicating that the source scan type of the pictures in the sequence is unknown, and a state indicating that the source scan type is independently indicated for each picture of the pictures in the sequence by a value of a picture-level syntax element that is to be signaled as part of an SEI message or to be inferred, wherein the first flag indicates whether the source scan type of the pictures is interlaced and the second flag is different from the first flag, is a separate syntax element from the first flag, and indicates whether the source scan type of the pictures is progressive;
    outputting the first flag and the second flag as part of encoded data in a bitstream or bitstream portion;
    determining, for a given picture of the pictures in the sequence, the value of the picture-level syntax element that indicates the source scan type of the given picture, the picture-level syntax element indicating one of the following states: a state indicating that the source scan type of the given picture is interlaced, a state indicating that the source scan type of the given picture is progressive, and a state indicating that the source scan type of the given picture is unknown, wherein, if the picture-level syntax element is not present in the encoded data in the bitstream or bitstream portion, the value of the picture-level syntax element is to be inferred according to rules that include:
        if the first flag and the second flag indicate that the source scan type of the pictures in the sequence is progressive, inferring the value of the picture-level syntax element to indicate that the source scan type of the given picture is progressive;
        if the first flag and the second flag indicate that the source scan type of the pictures in the sequence is interlaced, inferring the value of the picture-level syntax element to indicate that the source scan type of the given picture is interlaced; and
        otherwise, inferring the value of the picture-level syntax element to indicate that the source scan type of the given picture is unknown;
    if the picture-level syntax element is to be signaled, outputting the picture-level syntax element as part of the encoded data in the bitstream or bitstream portion;
    encoding the given picture; and
    outputting, as part of the encoded data in the bitstream or bitstream portion, the encoded given picture.

2. The method of claim 1, wherein the encoded data in the bitstream or bitstream portion further comprises a duplicate picture flag indicating whether one or more of the pictures are duplicate pictures.

3. The method of claim 1, wherein the first flag and the second flag are part of information for a profile, level, and tier in the bitstream or bitstream portion.

4. The method of claim 1, wherein the SEI message is a picture-timing SEI message.

5. The method of claim 1, wherein:
    if the first flag is 0 and the second flag is 0, the source scan type of the pictures in the sequence is unknown;
    if the first flag is 0 and the second flag is 1, the source scan type of the pictures in the sequence is progressive;
    if the first flag is 1 and the second flag is 0, the source scan type of the pictures in the sequence is interlaced; and
    if the first flag is 1 and the second flag is 1, the source scan type is independently indicated for each picture of the pictures in the sequence by the value of the picture-level syntax element for that picture.

6. The method of claim 5, wherein the picture-level syntax element for the given picture is not present in the encoded data, and wherein:
    if the first flag is 0 and the second flag is 0, the source scan type of the given picture is set to be unknown;
    if the first flag is 0 and the second flag is 1, the source scan type of the given picture is set to be progressive; and
    if the first flag is 1 and the second flag is 0, the source scan type of the given picture is set to be interlaced.

7. The method of claim 1, further comprising:
    determining the source scan type of the pictures in the sequence, including analyzing source scan characteristics of the pictures in the sequence.

8. The method of claim 1, further comprising:
    determining the source scan type of the given picture, including analyzing source scan characteristics of the given picture.

9. A tangible computer-readable media storing encoded data for a sequence of pictures in a bitstream or bitstream portion, the encoded data in the bitstream or bitstream portion including a first flag and a second flag for identifying source scan type of the pictures in the sequence, the first flag and the second flag collectively and exclusively indicating one of the following unique states for the sequence of pictures: a state indicating that the source scan type of the pictures in the sequence is interlaced, a state indicating that the source scan type of the pictures in the sequence is progressive, a state indicating that the source scan type of the pictures in the sequence is unknown, and a state indicating that the source scan type is independently indicated for each picture of the pictures in the sequence by a value of a picture-level syntax element that is to be signaled as part of an SEI message or to be inferred, wherein the first flag indicates whether the source scan type of the pictures is interlaced and the second flag is different from the first flag, is a separate syntax element from the first flag, and indicates whether the source scan type of the pictures is progressive, the encoded data being organized to facilitate decoding by operations that include:

determining, for a given picture of the pictures in the sequence, the value of the picture-level syntax element that indicates the source scan type of the given picture, the value of the picture-level syntax element indicating one of the following states: a state indicating that the source scan type of the given picture is interlaced, a state indicating that the source scan type of the given picture is progressive, and a state indicating that the source scan type of the given picture is unknown, wherein the determining the value of the picture-level syntax element includes:

determining whether or not the picture-level syntax element is present in the encoded data;

if the picture-level syntax element is present in the encoded data, setting the value of the picture-level syntax element according to the picture-level syntax element in the encoded data; and otherwise, the picture-level syntax element not being present in the encoded data, inferring the value of the picture-level syntax element, including:

if the first flag and the second flag indicate that the source scan type of the pictures in the sequence is progressive, inferring the value of the picture-level syntax element to indicate that the source scan type of the given picture is progressive;

if the first flag and the second flag indicate that the source scan type of the pictures in the sequence is interlaced, inferring the value of the picture-level syntax element to indicate that the source scan type of the given picture is interlaced; and otherwise, inferring the value of the picture-level syntax element to indicate that the source scan type of the given picture is unknown;

decoding the given picture; and processing the given picture in accordance with the source scan type of the given picture.

10. The tangible computer-readable media of claim 9, wherein the encoded data in the bitstream or bitstream portion further comprises a duplicate picture flag indicating whether one or more of the pictures are duplicate pictures.

11. The tangible computer-readable media of claim 9, wherein the first flag and the second flag are part of information for a profile, level, and tier in the bitstream or bitstream portion.

12. The tangible computer-readable media of claim 9, wherein the SEI message is a picture-timing SEI message.

13. The tangible computer-readable media of claim 9, wherein:

if the first flag is 0 and the second flag is 0, the source scan type of the pictures in the sequence is unknown;

if the first flag is 0 and the second flag is 1, the source scan type of the pictures in the sequence is progressive;

if the first flag is 1 and the second flag is 0, the source scan type of the pictures in the sequence is interlaced; and if the first flag is 1 and the second flag is 1, the source scan type is independently indicated for each picture of the pictures in the sequence by the value of the picture-level syntax element for that picture.

14. The tangible computer-readable media of claim 13, wherein the picture-level syntax element for the given picture is not present in the encoded data, and wherein:

if the first flag is 0 and the second flag is 0, the source scan type of the given picture is set to be unknown;

if the first flag is 0 and the second flag is 1, the source scan type of the given picture is set to be progressive; and if the first flag is 1 and the second flag is 0, the source scan type of the given picture is set to be interlaced.

15. A computer system comprising:

a buffer, implemented using memory, configured to receive encoded data for a sequence of pictures in a bitstream or bitstream portion, the encoded data in the bitstream or bitstream portion including a first flag and a second flag for identifying source scan type of the pictures in the sequence, the first flag and the second flag collectively and exclusively indicating one of the following unique states for the sequence of pictures: a state indicating that the source scan type of the pictures in the sequence is interlaced, a state indicating that the source scan type of the pictures in the sequence is progressive, a state indicating that the source scan type of the pictures in the sequence is unknown, and a state indicating that the source scan type is independently indicated for each picture of the pictures in the sequence by a value of a picture-level syntax element that is to be signaled as part of an SEI message or to be inferred, wherein the first flag indicates whether the source scan type of the pictures is interlaced and the second flag is different from the first flag, is a separate syntax element from the first flag, and indicates whether the source scan type of the pictures is progressive; and a video decoder, implemented using one or more processors, configured to perform operations comprising:

determining, for a given picture of the pictures in the sequence, the value of the picture-level syntax element that indicates the source scan type of the given picture, the value of the picture-level syntax element indicating one of the following states: a state indicating that the source scan type of the given picture is interlaced, a state indicating that the source scan type of the given picture is progressive, and a state indicating that the source scan type of the given picture is unknown, wherein the determining the value of the picture-level syntax element includes:

determining that the picture-level syntax element is not present in the encoded data; and inferring the value of the picture-level syntax element, including:

if the first flag and the second flag indicate that the source scan type of the pictures in the sequence is progressive, inferring the value of the picture-level syntax element to indicate that the source scan type of the given picture is progressive;

if the first flag and the second flag indicate that the source scan type of the pictures in the sequence is interlaced, inferring the value of the picture-level syntax element to indicate that the source scan type of the given picture is interlaced; and otherwise, inferring the value of the picture-level syntax element to indicate that the source scan type of the given picture is unknown;

decoding the given picture; and processing the given picture in accordance with the source scan type of the given picture.

16. The computer system of claim 15, wherein the encoded data in the bitstream or bitstream portion further comprises a duplicate picture flag indicating whether one or more of the pictures are duplicate pictures.

17. The computer system of claim 15, wherein the first flag and the second flag are part of information for a profile, level, and tier in the bitstream or bitstream portion.

18. The computer system of claim 15, wherein the SEI message is a picture-timing SEI message.

19. The computer system of claim 15, wherein:
if the first flag is 0 and the second flag is 0, the source scan type of the pictures in the sequence is unknown;
if the first flag is 0 and the second flag is 1, the source scan type of the pictures in the sequence is progressive;
if the first flag is 1 and the second flag is 0, the source scan type of the pictures in the sequence is interlaced; and
if the first flag is 1 and the second flag is 1, the source scan type is independently indicated for each picture of the pictures in the sequence by the value of the picture-level syntax element for that picture.

20. The computer system of claim 19, wherein:
if the first flag is 0 and the second flag is 0, the source scan type of the given picture is set to be unknown;
if the first flag is 0 and the second flag is 1, the source scan type of the given picture is set to be progressive; and
if the first flag is 1 and the second flag is 0, the source scan type of the given picture is set to be interlaced.

\* \* \* \* \*